UNITED STATES PATENT OFFICE.

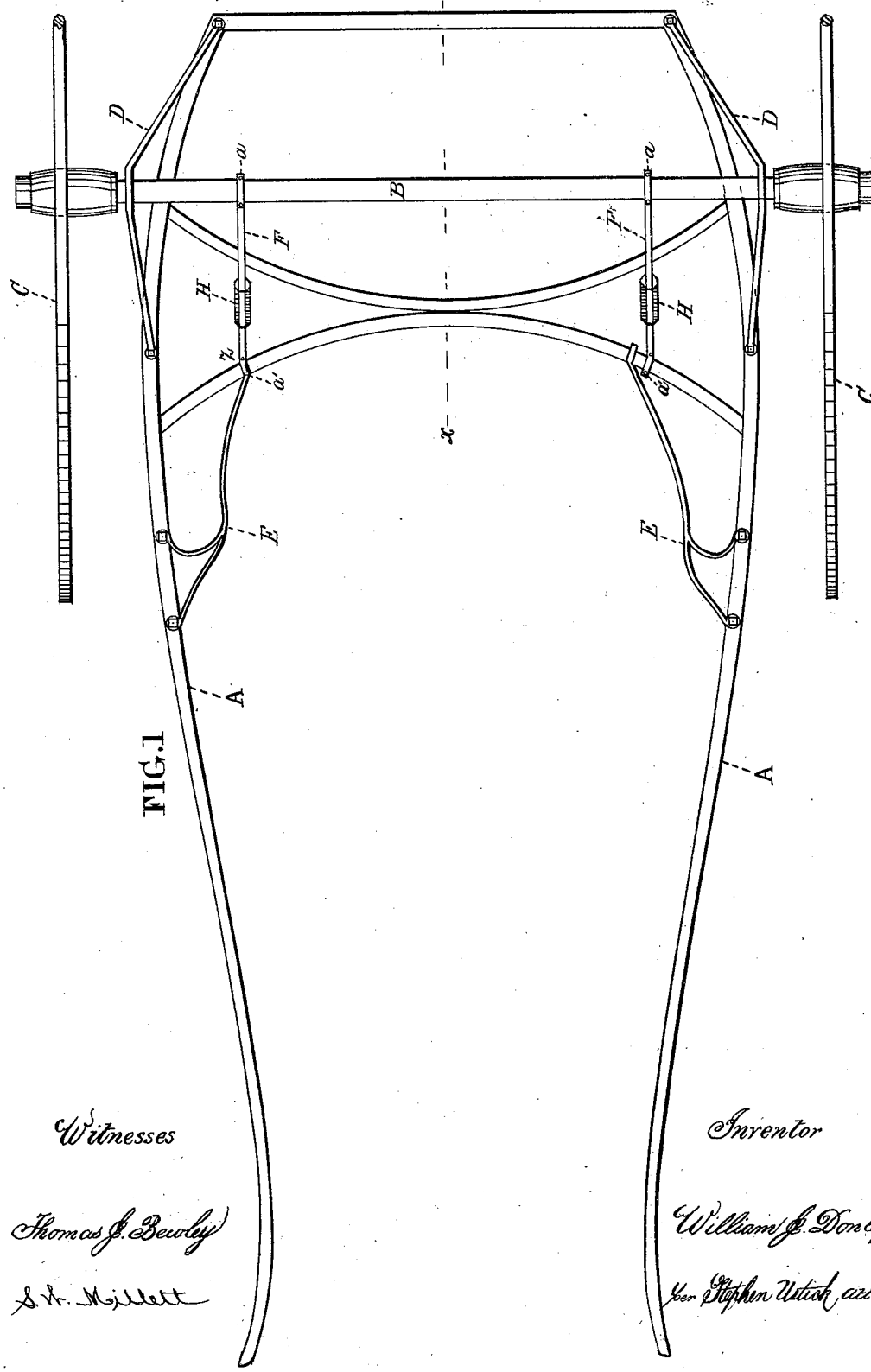

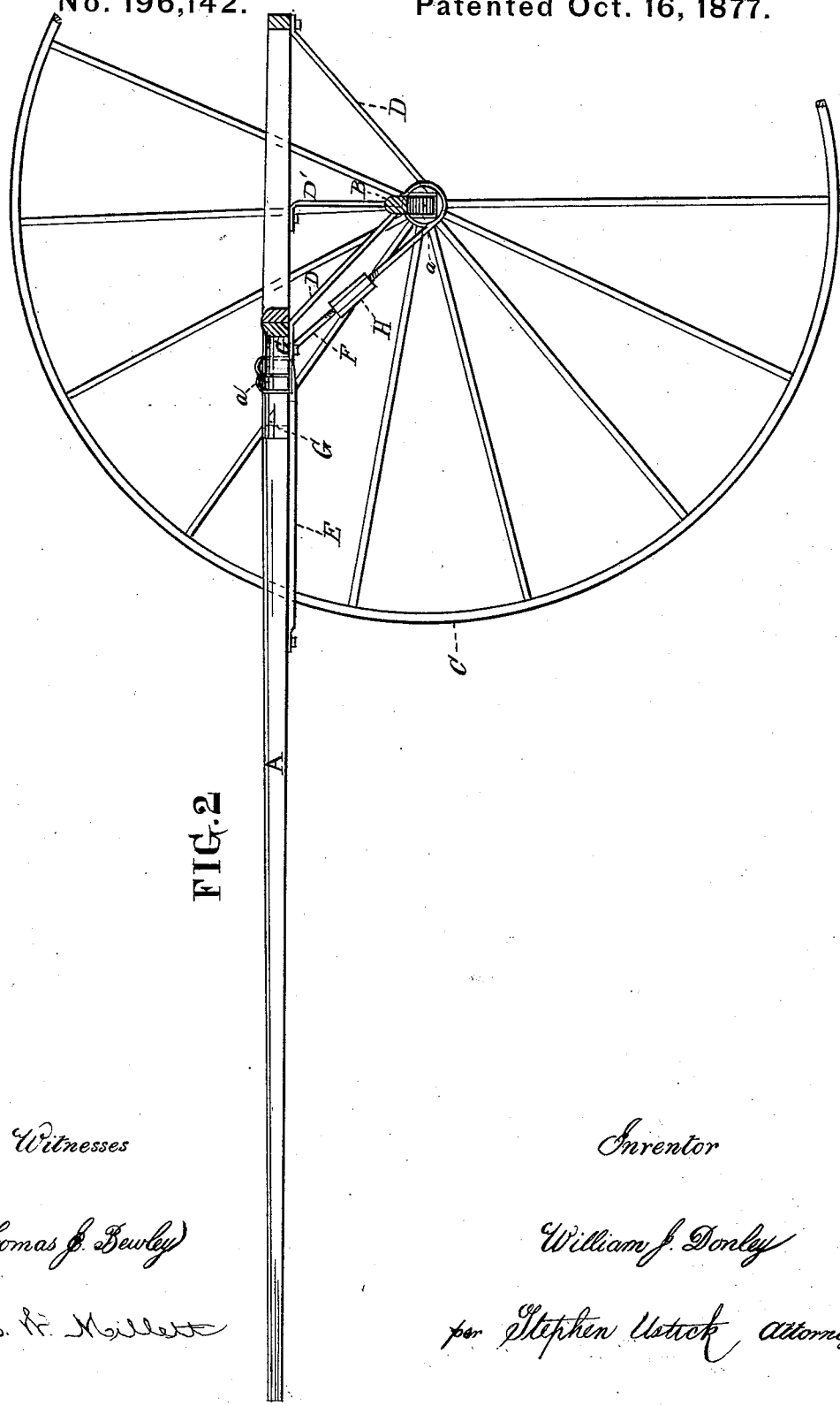

WILLIAM J. DONLEY, OF CAMDEN, NEW JERSEY, ASSIGNOR OF ONE-HALF HIS RIGHT TO CHARLES S. CAFFREY, OF SAME PLACE.

IMPROVEMENT IN TROTTING-SULKIES.

Specification forming part of Letters Patent No. 196,142, dated October 16, 1877; application filed July 31, 1877.

*To all whom it may concern:*

Be it known that I, WILLIAM J. DONLEY, of the city and county of Camden, in the State of New Jersey, have invented a new and useful improvement in stiffening the axles and regulating the gather of the wheels of track or trotting sulkies, which improvement is fully set forth in the following specification and the accompanying drawings, in which—

Figure 1 is a bottom view of the shafts and axle and parts attached. Fig. 2 is a sectional elevation taken at the line $x$ $x$ of Fig. 1.

Like letters of reference in both figures indicate the same parts.

The nature of my invention consists of brace-rods connected at one end with the axle, near its ends, and at the other end with the front cross-bar, in any suitable manner.

The invention consists in making these braces in two pieces, and connecting them with coupling-nuts having right and left screw-threads, for the purpose of lengthening or shortening the rods, as may be required, to regulate the gather of the wheels, as hereinafter fully described.

A A represent the shafts of a track or trotting sulky; B, the axle, and C C the wheels. D D are the stays or braces which support the axle, and D' D' the vertical braces, connected with the axle and shaft in the usual manner. E E are the stirrups or foot-irons.

My improvement consists of the braces F F, for increasing the lateral stiffness of the axle B. They connect with it and the front cross-bar G by means of the sockets or eyes $a$ at their ends.

The connections are made with the axle some distance from the end of the latter, as shown in the drawings, or may be at or near its journal-shoulders, or at any convenient points; and the connections may be made with the bar G at any desirable or suitable points, by which the desired lateral stiffness of the axle may be effected.

Instead of having independent sockets $a$ for connecting the braces with the cross-bar, for the sake of simplicity and cheapness of construction they may be united at their front ends with the sockets $a'$ of the stirrups E, as seen at the point $z$ in Fig. 1.

For the purpose of regulating the gather of the wheels I make the braces F F in two pieces, and connect them together by means of coupling-nuts H H, having right and left screw-threads, so that by turning the nuts in the proper direction for shortening the braces the ends of the axle are inclined rearward; or, by turning them in the opposite direction to lengthen the braces, they are inclined forward to bring the wheels in the desired position.

When it is only desired to use the braces F F for stiffening the axle, they are made in single pieces, thus omitting the use of the coupling-nuts H H.

I claim as my invention—

The brace-rods E F, made in two pieces, connected together by means of coupling-nuts H, in combination with the axle B and cross-bar G, for regulating the gather of the wheels, substantially as set forth.

WILLIAM J. DONLEY.

Witnesses:
STEPHEN USTICK,
S. W. MILLETT.